(12) United States Patent
Minami (10) Patent No.: US 12,308,648 B2
(45) Date of Patent: May 20, 2025

(54) ALTERNATING CURRENT GENERATOR

(71) Applicant: YAMABIKO CORPORATION, Tokyo (JP)

(72) Inventor: Yusuke Minami, Tokyo (JP)

(73) Assignee: YAMABIKO CORPORATION, Tokyo (JP)

( * ) Notice: Subject to any disclaimer, the term of this patent is extended or adjusted under 35 U.S.C. 154(b) by 0 days.

(21) Appl. No.: 18/365,403

(22) Filed: Aug. 4, 2023

(65) Prior Publication Data
US 2024/0072540 A1 Feb. 29, 2024

(30) Foreign Application Priority Data

Aug. 26, 2022 (JP) .................. 2022-134797

(51) Int. Cl.
*H02J 3/18* (2006.01)
*H02P 9/10* (2006.01)
*H02P 9/30* (2006.01)

(52) U.S. Cl.
CPC ............ *H02J 3/1885* (2013.01); *H02P 9/107* (2013.01); *H02P 9/305* (2013.01)

(58) Field of Classification Search
CPC .......... H02J 3/1885; H02P 9/107; H02P 9/305
See application file for complete search history.

(56) References Cited

U.S. PATENT DOCUMENTS

| | | | | | |
|---|---|---|---|---|---|
| 2,261,671 | A | * | 11/1941 | Bailey ..................... | H02P 9/00 322/23 |
| 3,947,762 | A | * | 3/1976 | Hug ..................... | G01R 21/001 324/142 |
| 4,090,122 | A | * | 5/1978 | Hoinski ................. | H02J 7/1423 320/125 |
| 4,214,198 | A | * | 7/1980 | Schneider ............. | H02J 7/1423 320/DIG. 31 |
| 4,296,269 | A | * | 10/1981 | Stewart .................. | H05B 7/148 373/104 |
| 4,300,089 | A | * | 11/1981 | Kawabe .................... | H02P 1/28 318/140 |

(Continued)

FOREIGN PATENT DOCUMENTS

JP 5487797 B2 5/2014

*Primary Examiner* — Tulsidas C Patel
*Assistant Examiner* — Thomas K Quigley
(74) *Attorney, Agent, or Firm* — BACON & THOMAS, PLLC (57) ABSTRACT

An alternating current generator driven by an engine and capable of obtaining power from an output terminal connected to armature windings according to a plurality of different power supply specifications includes a calculation processing device configured to calculate a remaining capacity from a voltage value between terminals of the output terminal and a current value of a current flowing to the output terminal, and display the remaining capacity. The calculation processing device performs: calculating the remaining capacity as an apparent power value; calculating usage power as an active power value to calculate remaining power by subtracting the usage power from a rated output of the engine; and comparing the remaining capacity with the remaining power, and outputting a smaller value as a remaining capacity display value indicated by the active power value.

5 Claims, 5 Drawing Sheets

(56) References Cited

U.S. PATENT DOCUMENTS

| | | | | |
|---|---|---|---|---|
| 5,229,713 A | * | 7/1993 | Bullock | G01R 21/1331 |
| | | | | 324/141 |
| 5,233,538 A | * | 8/1993 | Wallis | G01R 31/088 |
| | | | | 700/286 |
| 5,289,107 A | * | 2/1994 | Radun | H02P 9/40 |
| | | | | 318/696 |

* cited by examiner

ALTERNATING CURRENT GENERATOR

CROSS-REFERENCE TO RELATED APPLICATIONS

The present application claims priority from Japanese Patent Application No. 2022-134797 filed on Aug. 26, 2022, and the entire contents of which are hereby incorporated by reference.

BACKGROUND

1. Technical Field

The present invention relates to an alternating current generator.

2. Related Art

Conventionally, there has been known an alternating current generator capable of supplying power to loads according to a plurality of power supply specifications. Here, the power supply specifications indicate types of supplied power which are specified by a voltage, a frequency, the number of phases and so forth. This alternating current generator can supply power by selecting a frequency of 50 Hz or 60 Hz of, for example, a three-phase 200V power supply as an engine power supply for construction equipment, as well as a single phase 100V power supply or a single phase 200V power supply as a power supply for lighting equipment and an electric tool.

While supplying the power to a load according to the power supply specification of, for example, the single phase 100V, the alternating current generator can additionally connect a load according to the power supply specification of the single phase 100V or a load according to the power supply specification of the three-phase 200V. In this case, it is required to connect an additional load so as not to exceed the rated output of the alternating current generator. Here, the additional load which can be additionally connected is within a load corresponding to an available generation capacity, and this available generation capacity is referred to as "remaining capacity."

As related art, there has been proposed an alternating current generator capable of supplying power to loads according to a plurality of power supply specifications, which calculates the remaining capacity by subtracting the output supplied to the load currently connected from the rated output of the alternating current generator, and includes a remaining capacity display configured to display the calculated remaining capacity for each of the power supply specifications. See Japanese Patent No. 5487797. The entire contents of this disclosure are hereby incorporated by reference. According to this related art, when a user connects additional loads according to various power supply specifications, the display value on the remaining capacity display is an index to avoid connecting a load which causes overcapacity.

SUMMARY

The present invention provides an alternating current generator driven by an engine and capable of supplying power to an output terminal connected to armature windings according to a plurality of different power specifications. The alternating current generator includes a calculation processing device configured to calculate a remaining output capacity of the alternating current generator from a voltage value between terminals of the output terminal and a current value of a current flowing to the output terminal, and display the remaining output capacity. The calculation processing device performs: calculating remaining output capacity as an apparent power value from the voltage value and the current value, for each of the power specifications; calculating load power as an active power value from the voltage value and the current value, for each of the power specifications to calculate remaining power as the active power value by subtracting the load power as the active power value from a rated output of the engine; and comparing the remaining output capacity indicated by the apparent power value with the remaining power as the active power value for each of the power specifications, and outputting a smaller value as a remaining output capacity display value indicated by the active power value.

DETAILED DESCRIPTION

With the above-described related art, the remaining capacity is indicated by an apparent power (kVA) to clarify the relationship with the rated output of the alternating current generator, in view of protection of the generator body. However, the power (power consumption) of the connected load is indicated by an active power (kV) in general, and therefore there is demand to indicate the remaining capacity by the active power (kV) likewise.

On the other hand, in the case of an alternating current generator driven by an engine, even though loads are connected within the range of remaining capacity indicated by the apparent power, the total amount of power of the loads may exceed the rated output of the engine. In this case, the engine is overloaded, and therefore cannot be operated in a stable manner. Accordingly, the user is required to select an additional load in consideration of the relationship with the rated output of the engine. However, there is a problem that it is not possible to immediately know the relationship with the rated output of the engine from the remaining capacity indicated by the apparent power.

The present invention is proposed to address the above-described circumferences. It is therefore an object of the invention to clarify the relationship with the power consumption of a load additionally connected, by indicating the remaining capacity (available generation capacity) of the alternating current generator by an active power value, and to make it possible to select a load to be added, based on the displayed remaining capacity, regardless of the relationship with the rated output of the engine in an engine-driven alternating current generator.

Hereinafter, an embodiment of the present invention will be described with reference to the drawings. In the description below, the same reference numbers in the different drawings indicate the same functional parts, and therefore repeated description for each of the drawings is omitted.

Figure 1:
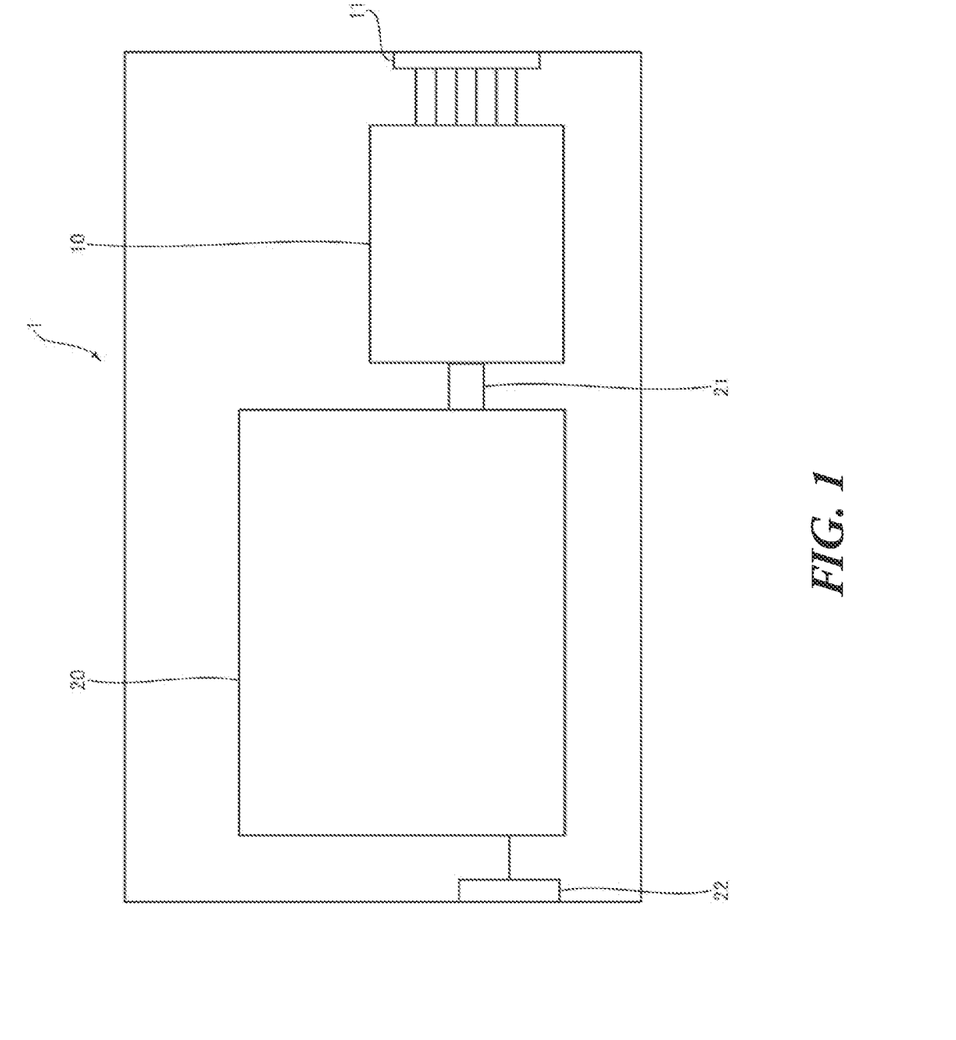
FIG. 1 illustrates a configuration example of an alternating current generator according to an embodiment of the invention.

As illustrated in FIG. 1, an alternating current generator 1 includes a generator 10, and an engine (diesel engine as an example) 20 configured to drive the generator 10. The generator 10 includes a rotor, and an armature or a stator (not shown), and an output shaft 21 of the engine 20 is connected to the rotor, and output wires drawn from the armature are connected to an output terminal 11 of the alternating current generator 1.

The alternating current generator 1 illustrated in FIG. 1 includes a frequency changeover switch 22 for the engine 20. This frequency changeover switch 22 is configured to switch the number of rotations of the output shaft 21 of the engine 20 between two phases. One number of rotations corresponds to one frequency (e.g. 50 Hz) of the alternating current generator 1, and the other number of rotations corresponds to the other frequency (e.g. 60 Hz) of the alternating current generator 1.

Figure 2:
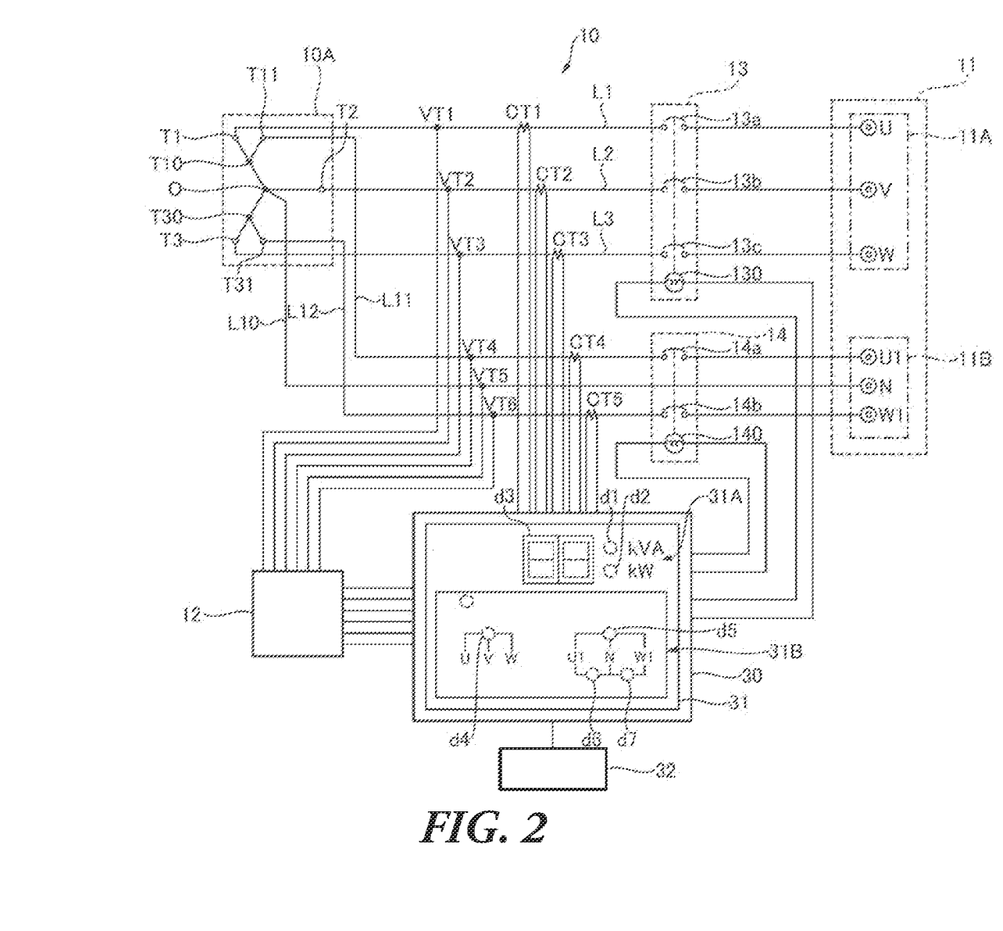
FIG. 2 illustrates the relationship between an armature and a calculation processing device of the alternating current generator according to an embodiment of the invention.
Figure 3:
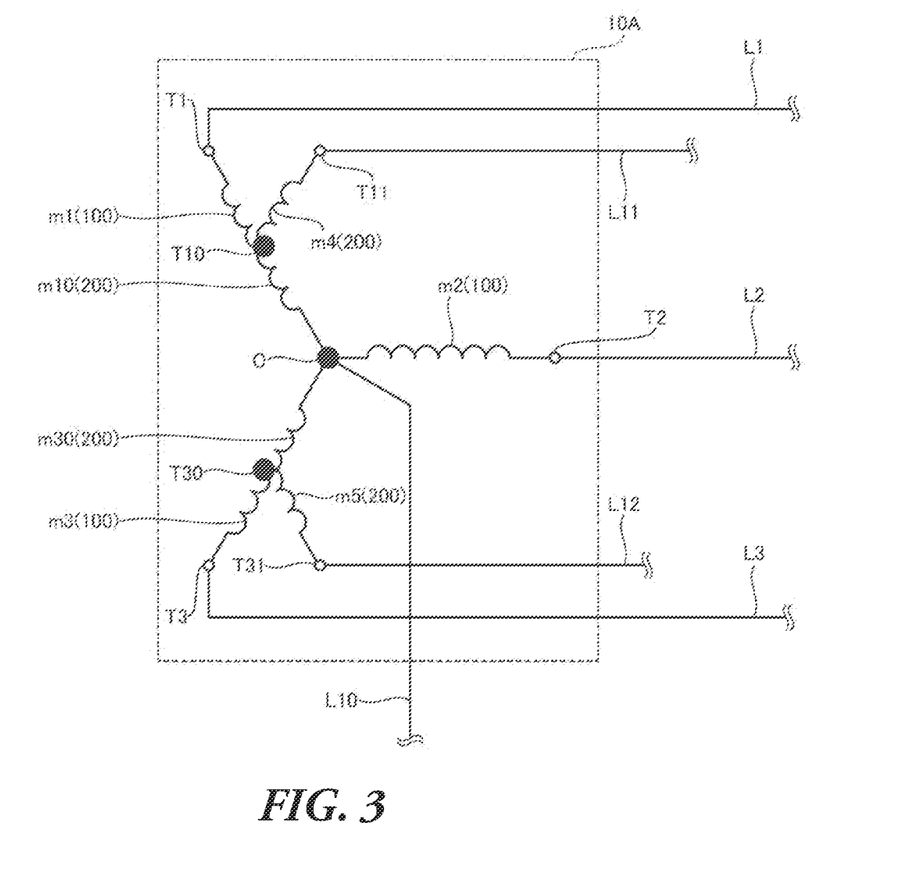
FIG. 3 illustrates a configuration example of armature windings of the alternating current generator according to an embodiment of the invention.

As illustrated in FIG. 2 and FIG. 3, the armature 10A of the generator 10 includes armature windings which can obtain power from the output terminal 11 according to a plurality of power supply specifications. The armature windings include three-phase windings or single phase windings, and a single phase winding part including part of the three-phase windings or the single phase windings as a common winding part.

An example of the armature windings of the armature 10A is illustrated in FIG. 3. This armature 10A includes three windings m1, m2, and m3 having the same number of turns and constituting a three-phase winding 100. In the three-phase winding 100, the beginnings of the turns of the windings m1, m2 and m3 are connected by a star connection at a neutral point O, and ends T1, T2, and T3 of the turns of the windings m1, m2, and m3 are connected to a three-phase output terminal 11A (U terminal, V terminal, W terminal) of the output terminal 11 via output wires L1, L2, and L3, respectively.

Moreover, as to the armature windings of the armature 10A, connecting points T10 and T30 are provided for the windings m1 and m3 at the intermediate positions (at the positions of the same number of turns from the beginnings), respectively, and branch windings m4 and m5 are connected to the connection points T10 and T30, respectively. Here, the branch windings m4 and m5 are turned and wound in the phase directions which are electrically symmetric with respect to the winding m2. Provided that part of the winding m1 from the beginning of the turn to the connection point T10 and part of the winding m3 from the beginning of the turn to the connection point T30 are common winding parts m10 and m30, the common winding part 10m, the branch winding m4, the common wining part m30, and the branch winding m5 form a single phase winding 200.

As to the single phase winding 200, the neutral point O is connected to an N terminal via an output wire L10; an end T11 of the turn of the winding m4 is connected to a U1 terminal via an output wire L11; and an end T31 of the turn of the winding m5 is connected to a W1 terminal via an output wire 12. Here, the N terminal, the U1 terminal, and the W1 terminal constitute a single phase output terminal 11B of the output terminal 11.

In the armature 10A illustrated in FIG. 3, the connecting points T10 and T30 are provided at the intermediate points of the windings m1 and m3, respectively, to divide the number of turns in half. In addition, all of the number of turns of the common winding parts m10 and m30 and the number of turns of the branch windings m4 and m5 are set to be equal to one another. Moreover, the branch windings m4 and m5 are turned and wound in the phase direction which is electrically opposite to the windings m3 and m1, respectively.

The generator 10 illustrated in FIG. 2 and FIG. 3 can supply power to loads according to four power supply specifications. Among them, a first power supply specification is for three-phase alternating-current output where a load is connected to the three-phase output terminal 11A (the U terminal, the V terminal and the W terminal) (for example, rated output: 20 kVA, rated current: 58 A, and rated voltage: 200 V). A second power supply specification is for single phase alternating-current output where a load is connected between the terminal U1 and the terminal W1 of the single phase output terminal 11B (for example, rated output: 11.6 kVA, rated current: 58 A, and rated voltage: 200 V). A third power supply specification is for single phase alternating-current output where a load is connected between the terminal U1 and the terminal N of the single phase output terminal 11B (for example, rated output: 5.8 kVA, rated current: 58 A, and rated voltage: 100 V). A fourth power supply specification is for single phase alternating-current output where a load is connected between the terminal W1 and the terminal N of the single phase output terminal 11B (for example, rated output: 5.8 kVA, rated current: 58 A, and rated voltage: 100 V). The frequency of each of the first to fourth power supply specifications can be switched between two frequencies (for example, 50 Hz and 60 Hz).

These power supply specifications (the first to fourth power supply specifications) may be individually used, and may be used together with one frequency, by optionally combining them. When a load is selectively connected to the terminal of the output terminal 11 depending on the intended power supply specification, a current flows to the output wire which connects between the terminal connected to the load and the armature winding. In this case, when the plurality of power supply specifications are used together, the currents depending on the power supply specifications being used may be superimposed and flow to the common winding parts m10 and m30.

Here, the above-described configuration of the armature 10A is merely an example. The alternating current generator 1 according to the embodiment of the invention is not limited to, in particular, the configuration of the armature 10A illustrated in FIG. 3. The generator 10 is not limited as long as the power can be obtained from the output terminal 11 connected to the armature windings according to different power supply specifications, and the winding form of the armature 10A is not limited.

The generator 10 of the alternating current generator 1 includes an calculation processing device 30 configured to calculate the remaining capacity from the voltage value between the terminals (between the output wires) of the output terminal 11, and the current value of the current flowing to the terminal of the output terminal 11 connected to the load, and to display the remaining capacity. With an example illustrated in FIG. 2, in order to obtain the voltage value and the current value described above, connecting points VT1, VT2, VT3, VT4, VT5, and VT6 for voltage measurement are provided on the output wires L1, L2, L3, L10, L1l, and L12, respectively, and current detecting elements CT1, CT2, CT3, CT4, and CT5 are provided on the output wires L1, L2, L3, L11, and L12, respectively.

With the illustrated example, the voltages measured via the connecting points VT1, VT2, VT3, VT4, VT5, and VT6 are inputted to the calculation processing device 30 via a transformer 12. Meanwhile, the currents detected by the current detecting elements CT1, CT2, CT3, CT4, and CT5 are inputted directly to the calculation processing device 30.

The calculation processing device 30 may be a control board mounted in the generator 10. The calculation processing device 30 includes a display unit 31 configured to display the remaining capacity obtained by calculation, and a remaining capacity display selection switch 32 configured to switch the display contents on the display unit 31 for each of the selected power supply specifications. The display unit 31 and the remaining capacity display selection switch 32 may be mounted on and integrated with the control board, or may be provided separately from the control board and connected to the control board by wiring.

Figure 4:
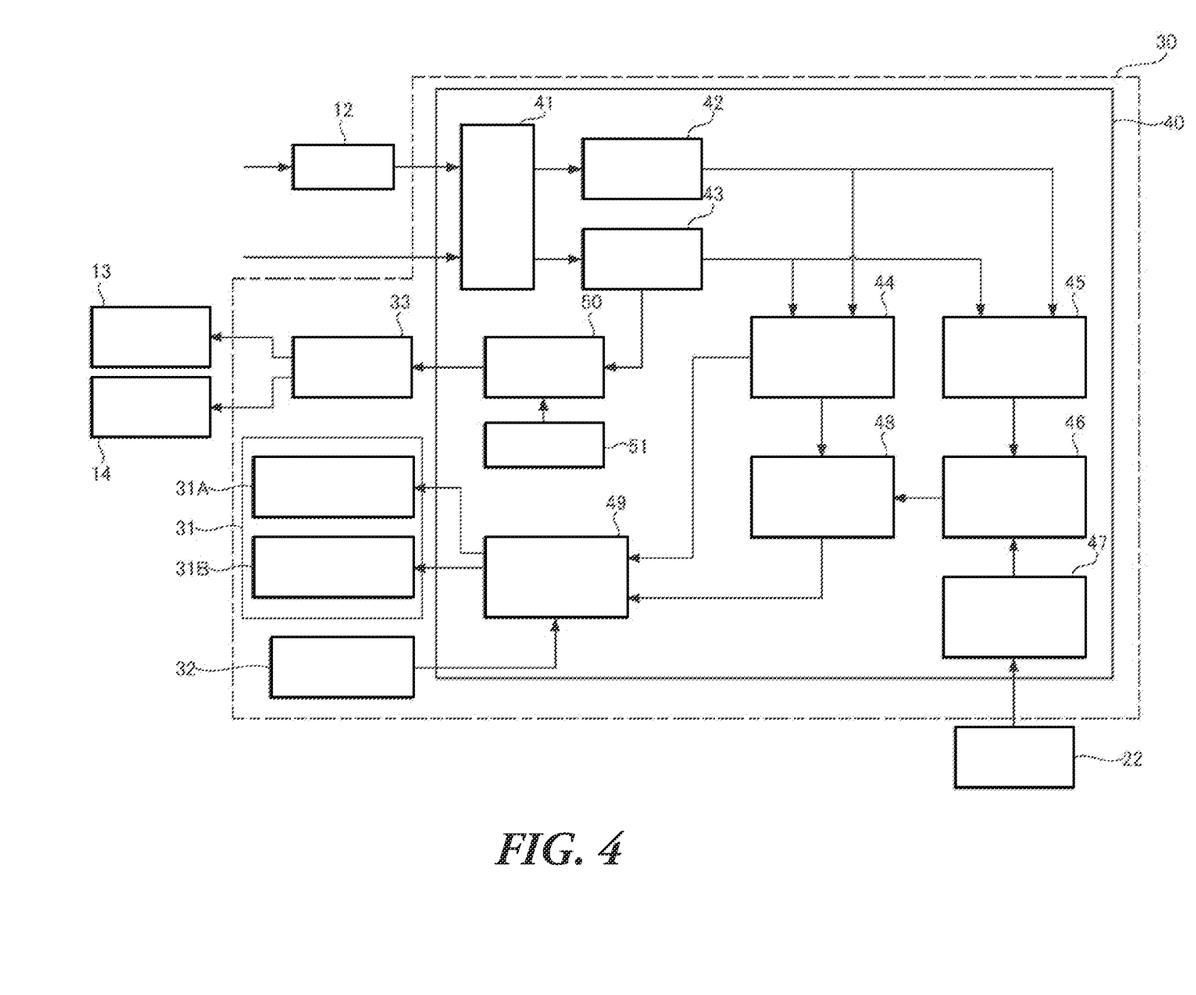
FIG. 4 illustrates a processor of the calculation processing device.

In addition, as illustrated in FIG. 4, the calculation processing device 30 includes a calculation processing unit 40 configured to perform various kinds of processing. The calculation processing unit 40 is a computer incorporating programs to perform processing in each of parts described later, and has a hardware configuration illustrated in FIG. 5.

Figure 5:
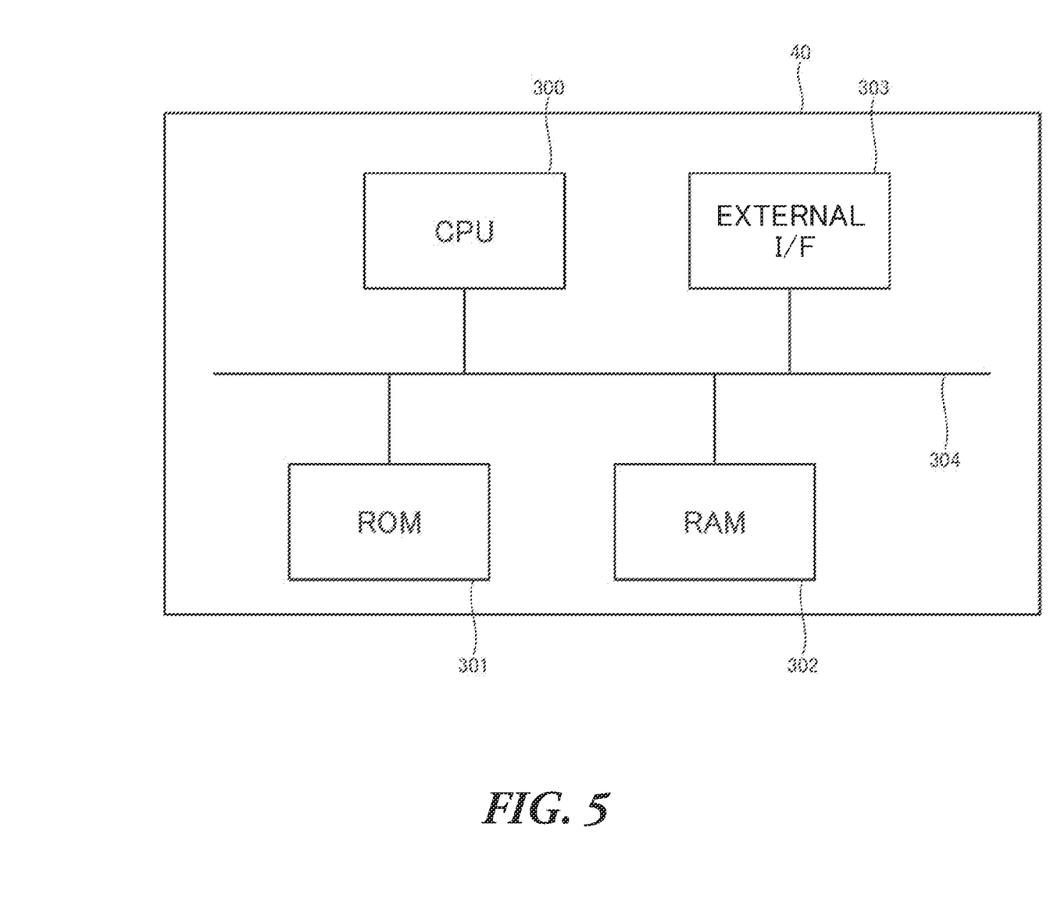
FIG. 5 illustrates the hardware configuration of a calculation processing unit of the calculation processing device.

As illustrated in FIG. 5, the calculation processing unit 40 includes a CPU (central processing unit) 300 configured to perform calculation processing, a ROM (read only memory) 301 and a RAM (random access memory) 302 as memories configured to store information and programs, and an external I/F (interface) 303. These hardwares are connected to each other via a bus 304.

The CPU 300 executes various programs stored in the ROM 301 to control the processing of the calculation processing unit 40. The ROM 301 is a nonvolatile memory. For example, the ROM 301 stores the programs executed by the CPU 300, and data required for the CPU 300 to execute the programs. The RAM 302 is a main memory such as a DRAM (dynamic random access memory) and a SRAM (static random access memory). For example, the RAM 302 functions as a working area used by the CPU 300 to execute the programs. The external I/F 303 is generally configured to control transmitting and receiving of signals to and from the outside, and functions as an A/D converter 41 described later in the calculation processing unit 40.

The calculation processing unit 40 includes function parts to perform the processing to calculate and display the remaining capacity, which are the A/D converter 41, an output voltage value calculator 42, an output current value calculator 43, remaining capacity (kVA) calculator 44, a usage power (kW) calculator 45, a remaining power (kW) calculator 46, an engine rated output (kW) memory 47, a remaining capacity (kW) calculator 48, and a remaining capacity display selector 49.

The A/D converter 41 converts an analog signal of the voltage between the terminals of the output terminal 11, which is inputted via the transformer 12, to a digital signal, and outputs the digital signal to the output voltage value calculator 42; and converts an analog signal of the detected current flowing to the output terminal 11 to a digital signal, and outputs the digital signal to the output current value calculator 43.

The output voltage value calculator 42 outputs a voltage value for each of the power supply specifications, based on the inter-terminal voltage converted to the digital signal. With the example illustrated in FIG. 2, the output voltage value calculator 42 outputs the voltage value of the inter-terminal voltage for each of the first to fourth power supply specifications. That is, in the case of the three-phase alternating-current output of the first power supply specification, the output voltage value calculator 42 calculates and outputs the effective values of the voltage between connecting points VT1 and VT2, the voltage between the connecting points VT2 and VT3, and the voltage between the connecting points VT1 and VT3. In the case of the single phase alternating-current output of the second power supply specification, the output voltage value calculator 42 calculates and outputs the effective value of the voltage between the connecting points VT5 and VT6. Moreover, in the cases of the third power supply specification and the fourth power supply specification, the output voltage value calculator 42 calculates and outputs the effective values of the voltage between the connecting points VT4 and VT5, and the voltage between the connecting points VT4 and VT6, respectively. Alternatively, the output voltage of the single phase alternating-current output may be obtained by (VT4+VT6)/2, where VT4 is the voltage at the connecting point VT4, and VT6 is the voltage at the connecting point VT6.

The output current value calculator 43 outputs the current value based on the detected current converted to the digital signal, for each of the power supply specifications being used to connect loads. That is, with the example illustrated in FIG. 2, the output current value calculator 43 calculates and outputs the effective value of the current flowing to the output terminal 11 for each of the first to fourth power supply specifications being used.

Here, when the first power supply specification is used, the effective value of the current flowing to the terminal U and the terminal W is outputted; when the second power supply specification is used, the effective value of the current flowing to the terminal U1 and the terminal W1 is outputted; and when one of the third power supply specification and the fourth power supply specification is used, the effective value of the current flowing to one of the terminal U1 and the terminal W1 is outputted.

The remaining capacity (kVA) calculator 44 calculates the remaining capacity as the apparent power value (kVA) for each of the power supply specifications, from the voltage value (effective value) outputted by the output voltage value calculator 42 and the current value (effective value) outputted by the output current value calculator 43.

Here, on the premise that the specific power supply specification is used, the apparent usage power (kVA) is calculated by multiplying the voltage value outputted by the output voltage value calculator 42 and the current value outputted by the output current value calculator 43, and subtracting the product from the rated output (kVA) for each of the power supply specifications of the generator 10, and consequently the remaining capacity (kVA) for each of the power supply specifications is calculated. In this case, naturally, when no power supply specification is currently used, the current value outputted by the output current value calculator 43 is zero. Therefore, when no power supply specification is currently used, the apparent usage power (kVA) is zero, and the remaining capacity (kVA) is the rated output (kVA) of the generator 10, in each case of the power supply specifications.

The usage power (kW) calculator 45 calculates the usage power as the active power value (kW) for each of the power supply specifications, from the voltage value (effective value) outputted by the output voltage value calculator 42, and the current value (effective value) outputted by the output current value calculator 43. Here, the usage power (kW) for each of the power supply specifications is calculated by multiplying the product of the voltage value outputted by the output voltage value calculator 42 and the current value outputted by the output current value calculator 43 by a power factor cos θ.

Here, the power factor cos θ is calculated by using a phase difference θ which is calculated from the periodic variation in the detected voltage value inputted to the output voltage value calculator 42, and the periodic variation in the detected current value inputted to the output current value calculator 43.

The remaining power (kW) calculator 46 calculates the remaining power (kW) by subtracting the usage power (kW) for each of the power supply specifications outputted by the usage power (kW) calculator 45 from the engine rated output (kW) stored in the engine rated output (kW) memory 47. The calculated remaining power (kW) indicates that if a load having the power consumption (kW) greater than this remaining power (kW) is added, the rated output of the engine 20 is exceeded.

The engine rated output (kW) is set for each of the frequencies (e.g. 50 Hz and 60 Hz) selected for the alternating-current output, and a setting value for each of the frequencies is stored in the engine rated output (kW) memory 47. By this means, when the frequency is selected by the switching of the frequency changeover switch 22, the engine rated output (kW) corresponding to the selected frequency is outputted from the engine rated output (kW) memory 47 to the remaining power (kW) calculator 46.

The remaining capacity (kW) calculator 48 compares between the apparent power value (kVA) of the remaining capacity outputted by the remaining capacity (kVA) calculator 44 and the active power value (kW) of the remaining power outputted by the remaining power (kW) calculator 46 for each of the power supply specifications, and outputs the smaller value, as the active power display value (kW) of the remaining capacity, to the remaining capacity display selector 49.

The remaining capacity (kVA) indicated by the apparent power value from the remaining capacity (kVA) calculator 44 is inputted to the remaining capacity display selector 49 for each of the power supply specifications. Also, as described above, the remaining capacity (kW) indicated by the active power value from the remaining capacity (kW) calculator 48 is inputted to the remaining capacity display selector 49. Then, the remaining capacity display selector 49 selectively switches the display value outputted to the remaining capacity display 31A of the display unit 31, based on the input from the remaining capacity display selection switch 32, and selectively switches the display of the power supply specification display 31B of the display unit 31.

With the remaining capacity display selection switch 32, the power supply specification is selected and inputted, and the display is switched between the remaining capacity indicated by the apparent power (kVA) and the remaining capacity indicated by the active power (kW). To be more specific with the example illustrated in FIG. 2, the remaining capacity display 31A of the display unit 31 includes two display parts d1 and d2 to display whether the display value is the apparent power value or the active power value, and a display part d3 to display the display value as the numeric value. In addition, the power supply specification display 31B of the display unit 31 includes four display parts d4, d5, d6, and d7 to display the selected power supply specification.

Then, by first switch operation of the remaining capacity display selection switch 32, the display part d1 of the remaining capacity display 31A is turned on, the display part d4 of the power supply specification display 31B is turned on, and the remaining capacity (kVA) indicated by the apparent power value according to the first power supply specification is displayed on the display part d3.

By second switch operation of the remaining capacity display selection switch 32, the display part d1 of the remaining capacity display 31A is turned on, the display part d5 of the power supply specification display 31B is turned on, and the remaining capacity (kVA) indicated by the apparent power value according to the second power supply specification is displayed on the display part d3.

By third switch operation of the remaining capacity display selection switch 32, the display part d1 of the remaining capacity display 31A is turned on, the display part d6 of the power supply specification display 31B is turned on, and the remaining capacity (kVA) indicated by the apparent power value according to the third power supply specification is displayed on the display part d3.

By fourth switch operation of the remaining capacity display selection switch 32, the display part d1 of the remaining capacity display 31A is turned on, the display part d7 of the power supply specification display 31B is turned on, and the remaining capacity (kVA) indicated by the apparent power value according to the fourth power supply specification is displayed on the display part d3.

By fifth switch operation of the remaining capacity display selection switch 32, the display part d2 of the remaining capacity display 31A is turned on, the display part d4 of the power supply specification display 31B is turned on, and the remaining capacity (kW) indicated by the active power value according to the first power supply specification is displayed on the display part d3.

By the sixth switch operation of the remaining capacity display selection switch 32, the display part d2 of the remaining capacity display 31A is turned on, the display part d5 of the power supply specification display 31B is turned on, and the remaining capacity (kW) indicated by the active power value according to the second power supply specification is displayed on the display part d3.

By seventh switch operation of the remaining capacity display selection switch 32, the display part d2 of the remaining capacity display 31A is turned on, the display part d6 of the power supply specification display 31B is turned on, and the remaining capacity (kW) indicated by the active power value according to the third power supply specification is displayed on the display part d3.

By eighth switch operation of the remaining capacity display selection switch 32, the display part d2 of the remaining capacity display 31A is turned on, the display part d7 of the power supply specification display 31B is turned on, and the remaining capacity (kW) indicated by the active power value according to the fourth power supply specification is displayed on the display part d3.

In this way, when the switch operation of the remaining capacity display selection switch 32 is inputted, the remaining capacity display selector 49 switches the display of the remaining capacity display 31A and the display of the power supply specification display 31B, and displays the display value of the remaining capacity selected by the remaining capacity display selector 49 on the display part d3 of the remaining capacity display 31A, depending on the selected power supply specification. In this case, when, with the remaining capacity display selection switch 32, the displaying of the apparent power is selected to turn on the display part d1, the display part d3 displays the value of the remaining capacity (kVA) outputted from the remaining capacity (kVA) calculator 44.

Meanwhile, when, with the remaining capacity display selection switch 32, the displaying of the active power is selected to turn on the display part d2, the display part d3 displays the display value outputted from the remaining capacity (kW) calculator 48. That is, the display part d3 displays the smaller one of the apparent power value (kVA) of the remaining capacity outputted by the remaining capacity (kVA) calculator 44 and the active power value (kW) of the remaining power outputted by the remaining power (kW) calculator 46, for each of the selected power supply specifications.

Now, the method of operation of the remaining capacity display selection switch 32 will be explained in the concrete. On the premise that an additional load is connected according to the power supply specification not being currently used, the user operates the remaining capacity display selection switch 32 to display the remaining capacity of the power supply specification which will be used from now (is not being currently used).

Here, in the case where the displaying of the active power is selected to turn on the display part d2, when the display value on the display part d3 is the remaining power (kW) outputted by the remaining power (kW) calculator 46, the user can compare the display value on the display part d3 with the power consumption (kW) of the load to be added from now, and immediately determine whether the additional load causes the overcapacity for each of the rated output of the engine and the rated output of the generator 10.

Meanwhile, in the case where the displaying of the active power is selected to turn on the display part d2, when the display value on the display part d3 is the remaining capacity (kVA) outputted by the remaining capacity (kVA) calculator 44, that is, the value of the remaining capacity (kVA) outputted by the remaining capacity (kVA) calculator 44 is smaller than the remaining power (kW) outputted by the remaining power (kW) calculator 46, the user compares the display value of the remaining capacity (kVA) with the power consumption (kW) of the load to be added. In this case, before the load is connected, it is not possible to correctly know the power factor cos θ after the load is connected, and therefore, the user selects the load not to cause the overcapacity for each of the rated output of the engine and the rated output of the generator 10 by using the display value as one index.

If the power factor cos θ after the load is connected is quite smaller than 1, the overcapacity may occur even though the load having the power consumption (kW) smaller than the display value of the remaining capacity (kVA) is connected. To address this, as illustrated in FIG. 2 and FIG. 4, wire breakers 13 and 14 are provided to prevent the armature 10A from being damaged.

The wire breaker 13 is provided for the output wires L1, L2 and L3 connected to the three-phase output terminal 11A, and shuts off the output wires L1, L2, and L3 by actuating breakers 13a, 13b and 13c, respectively. The wire breaker 14 is provided for the output wires L11 and L12 connected to the single phase output terminal 11B, and shuts off the output wires L11 and L12 by actuating breakers 14a and 14b, respectively.

The actions of the wire breakers 13 and 14 are actuated by actuators 130 and 140 of the wire breakers 13 and 14 which are driven by a wire breaker drive part 33, when a shutoff determination part 50 compares the output of the output current value calculator 43 with a shutoff current 51, and the output of the output current value calculator 43 after the load is connected is greater than the shutoff current 51. When the actuators 130 or 140 is driven, the breakers 13a, 13b, and 13c, or the breakers 14a and 14b are actuated to prevent an overcurrent from flowing to the armature 10A.

Here, when the overcapacity occurs after the load is connected, "−" is displayed on the display part d3 to cause the user to visually recognize the overcapacity, for each of the case where the displaying of the apparent power is selected to turn on the display part d1, and the case where the displaying of the active power is selected to turn on the display part d2. By this means, it is possible to cause the user to know the overcapacity before the wire breakers 13 and 14 are actuated. Consequently, it is possible to prevent the destruction of the armature 10A by fire, and prevent the wires from being suddenly shut off by the wire breakers 13 and 14.

As described above, the alternating current generator 1 according to the embodiment of the invention displays the remaining capacity indicated by the active power to clarify the relationship between the remaining capacity and the power consumption of the load to be added. Therefore, it is possible to prevent the load which causes the overcapacity from being connected. In addition, when the remaining capacity is indicated by the active power, the remaining capacity is calculated from the rated output of the engine. By this means, it is possible to prevent the number of rotations of the engine from being reduced due to the overload, and prevent the engine from being stopped due to the overload. Moreover, it is possible to lengthen the life of the product by preventing the overload of the engine.

As described above, it is possible to clarify the relationship with the power consumption of a load additionally connected, by indicating the remaining capacity (available generation capacity) of an alternating current generator by an active power value. In addition, it is possible to select a load to be added based on the displayed remaining capacity, regardless of the relationship with the rated output of the engine in an engine-driven alternating current generator.

As described above, the embodiment of the present invention has been described in detail with reference to the drawings. However, the specific configuration is not limited to the embodiment, and the design can be changed without departing from the scope of the present invention. In addition, the above-described embodiment can be combined by utilizing each other's technology as long as there is no particular contradiction or problem in the purpose and configuration.

The invention claimed is:
1. An AC generator configured to output power at a plurality of different power specifications when driven by an engine, the AC generator comprising:
 a plurality of armature windings;
 an output terminal connected to the plurality of armature windings and configured to output electrical power;
 a remaining power controller configured to calculate a safe remaining output capacity value of the AC generator for each of the plurality of different power specifications based on an output voltage value measured at the output terminal and an output current value measured at the output terminal;
 a display configured to display the safe remaining output capacity value for each of the plurality of different power specifications;
 wherein the remaining power controller includes a processor configured to:
 calculate a remaining apparent power output capacity value for each of the plurality of different power specifications based on the output voltage value and the output current value;

calculate an active load power value for each of the plurality of different power specifications based on the output voltage value and the output current value;

calculate a remaining active power value for each of the plurality of different power specifications by subtracting the respective active load power value from a rated output of the engine; and compare, for each of the plurality of different power specifications, the respective remaining apparent power output capacity value to the respective remaining active power value and output the lower value as the safe remaining output capacity value.

2. The AC generator according to claim 1, wherein the processor is further configured to selectively switch between displaying the remaining apparent power output capacity value and the remaining active power value.

3. The AC generator according to claim 1, wherein the processor is further configured to selectively switch between displaying the remaining apparent power output capacity value and the remaining active power value for each of the different power specifications.

4. The AC generator according to claim 1, wherein the armature windings include a three-phase winding, and a single-phase winding including at least part of the three-phase winding as a common winding part.

5. The AC generator according to claim 1, wherein the rated output of the engine is set for a frequency of each of the different power specifications.

* * * * *